United States Patent [19]

Horikawa et al.

[11] Patent Number: 4,644,433
[45] Date of Patent: Feb. 17, 1987

[54] MAGNETIC TAPE CASSETTE HAVING INTEGRATED OPTICAL ELEMENTS

[75] Inventors: Kenichi Horikawa, Tokyo; Yoshinori Yamamoto; Kenji Kawakami, both of Kanagawa, all of Japan

[73] Assignee: Sony Corporation, Tokyo, Japan

[21] Appl. No.: 673,730

[22] Filed: Nov. 21, 1984

[30] Foreign Application Priority Data

Nov. 25, 1983 [JP] Japan .............................. 58-181669[U]

[51] Int. Cl.⁴ .............................................. G11B 23/08
[52] U.S. Cl. ................................................... 360/132
[58] Field of Search ......................... 360/132; 242/198

[56] References Cited

FOREIGN PATENT DOCUMENTS

3415808 10/1984 Fed. Rep. of Germany ...... 360/132

*Primary Examiner*—Robert S. Tupper
*Attorney, Agent, or Firm*—Hill, Van Santen, Steadman & Simpson

[57] ABSTRACT

A magnetic tape cassette in which a tape end detecting optical guide and a transparent window plate through which a tape winding state is viewed are coupled together by coupling members and of which all the components are made integral, of transparent resin. Thus, the number of assembly parts of the magnetic tape cassette is decreased and the assembling work thereof greatly simplified.

2 Claims, 13 Drawing Figures

MAGNETIC TAPE CASSETTE HAVING INTEGRATED OPTICAL ELEMENTS

BACKGROUND OF THE INVENTION

1. Field of the Invention

The present invention generally relates to magnetic tape cassettes and, in particular, is directed to a magnetic tape cassette suitable for use for recording a digital signal, for example, a PCM (pulse code modulated) signal.

2. Description of the Prior Art

At present, a PCM recording and reproducing apparatus has been proposed in which in analog signal such as an audio signal or the like is converted into a digital signal, for example, a PCM signal and then recorded on (or reproduced from) a magnetic tape. In the known PCM recording and reproducing apparatus, there is one which uses a rotary head to provide a relatively high recording density. In such PCM recording and reproducing apparatus having the rotary head, upon recording or reproducing, a magnetic tape is drawn out from the tape cassette, wound around the rotary drum in which the rotary head is provided, and the recording or reproducing is carried out.

In the tape cassette incorporating such a magnetic tape, if an oil component such as fingerprints or the like, and dust adhere to the magnetic tape, a dropout may be caused in the reproduced signal. Accordingly, in order to prevent such an oil component from adhering to the magnetic tape, the magnetic tape has to be held in a closed state as tightly as possible. Moreover, it is necessary to provide a space in front of the tape cassette through which a tape guide system is inserted into the tape cassette for drawing out the magnetic tape from the tape cassette for recording or reproducing.

Figure 1:
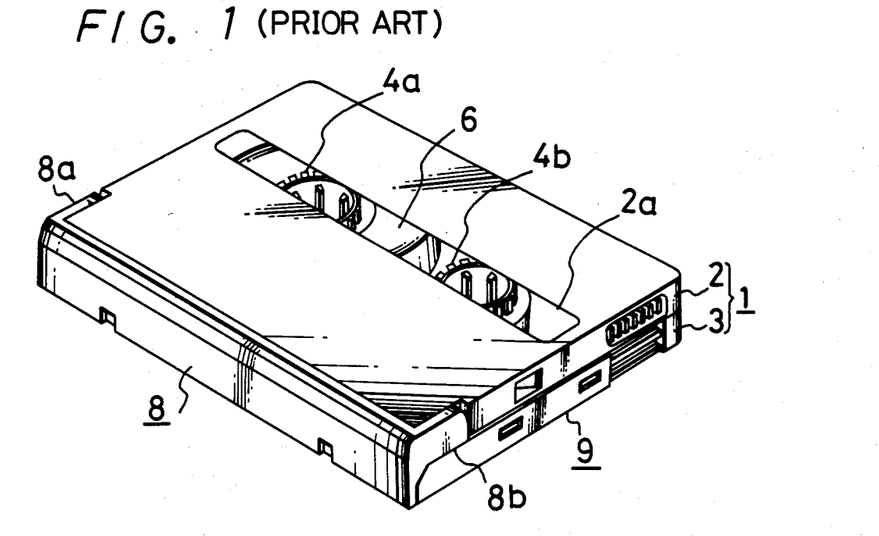
FIG. 1 is a perspective view showing an example of a prior art tape cassette having a rotatable front lid and a slidable slider.
Figure 2:
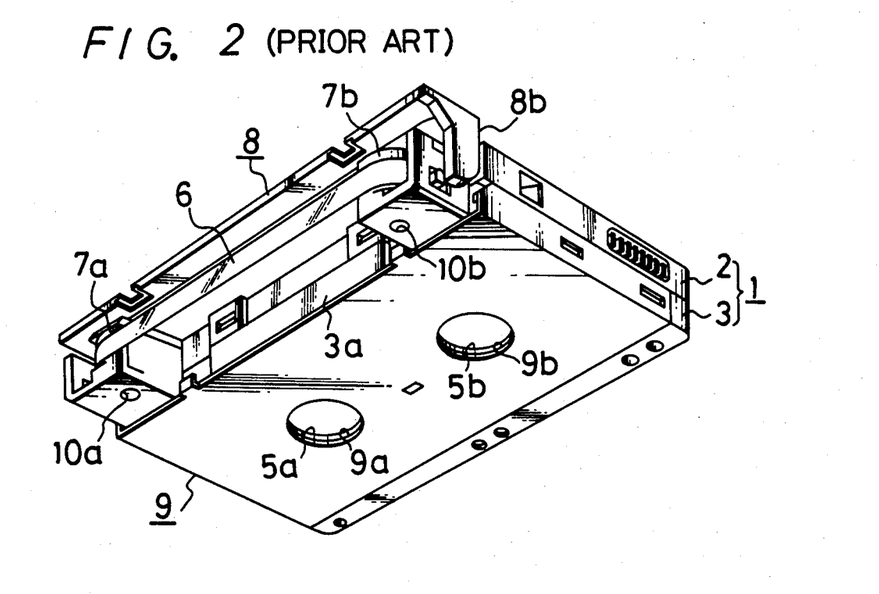
FIG. 2 is a perspective view showing the example of the prior art tape cassette shown in FIG. 1 in which the front lid thereof is rotated in the upper direction and the slider is slid backwards.

Therefore, such a tape cassette as shown in FIGS. 1 and 2 has been proposed. In FIGS. 1 and 2, reference numeral 1 generally designates a cassette casing and this cassette casing 1 consists of an upper half 2 and lower half 3 which are formed integral by screw bolts (not shown). Reference numeral 2a designates a transparent window plate provided on the upper surface portion of the upper half 2. The inside of the cassette casing 1 can be seen through this transparent window plate 2a. Reference numerals 4a and 4b designate a pair of reel hubs which are incorporated into the cassette casing 1 and rotatably engaged with a pair of reel shaft insertion apertures 5a and 5b which are formed through the lower half 3 at predetermined positions. A magnetic tape 6 is wound around the pair of reel hubs 4a and 4b. Reference numerals 7a and 7b respectively designate tape guide columns which are positioned on the lower half 3 facing the front portion of the tape cassette near the right and left side wall portions. The magnetic tape 6 is stretched between and in contact with the tape guide columns 7a and 7b so as to run at a predetermined position relative to the front surface portion of the tape cassette. Reference numeral 3a designates a cut-out portion formed through the lower half 3 over a predetermined width in a rectangular shape at the portion opposing the rear surface of the magnetic tape 6 stretched between the tape guide columns 7a and 7b. Upon recording or reproducing, a tape guide system is inserted into this cut-out portion 3a. The system is adapted to draw out the magnetic tape 6 and is provided in the recording and reproducing apparatus, not shown.

Reference numeral 8 designates a front lid which is pivoted to the cassette front side of casing 1 through arm portions 8a and 8b which are formed at both sides thereof. This front lid 8 is adapted to open and/or close the front surface portion of the cassette casing 1.

Reference numeral 9 designates a sliding member of nearly U-shape which is provided such that it can be slidably moved back and forth in opposing relation to the lower surface and right and left side wall portions of the lower half 3. Reference numerals 9a and 9b respectively designate reel shaft insertion apertures which are bored through the slider 9 at such positions that when the sliding member is slibably moved backward so as to expose the cut-out portion 3a, they correspond to the reel shaft insertion apertures 5a and 5b, respectively. Reference numerals 10a and 10b respectively designate positioning holes which are formed from the lower surface portion of the lower half 3 in correspondence with the tape guide columns 7a and 7b.

Figure 3:
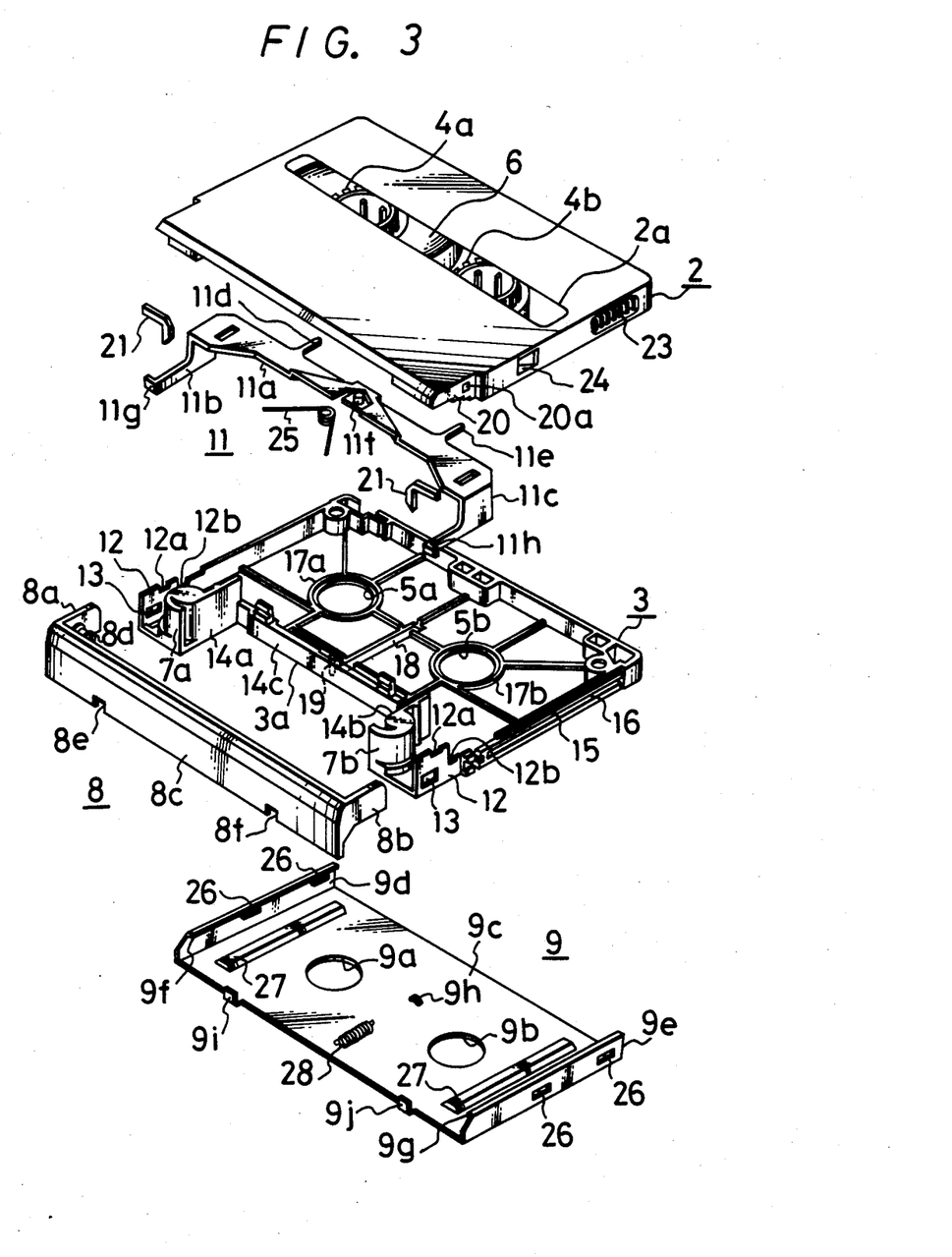
FIG. 3 is an exploded perspective view of the magnetic tape cassette shown in FIG. 1.

As shown in FIG. 3, this tape cassette is formed such that the front lid 8, the sliding member 9 and a reel brake member 11, which will be described later, are respectively assembled between the upper half 2 and the lower half 3 at predetermined positions, each being made of synthetic resin, for example, ABS resin.

The lower half 3 will be further described with reference to FIG. 3. This lower half 3 consists of a flat plate portion of substantially rectangular shape through which the reel shaft insertion apertures 5a and 5b are formed and a frame portion which is formed of right and left side wall portions except the front surface portion at which the front lid 8 is disposed and a rear surface wall portion. In this case, the right and left side wall portions and the lower surface portion of the lower half 3 except the slidable range of the sliding member 9 are formed thick by the thickness of the sliding member 9 whereby the right and left side wall portions and the lower surface portion of the lower half 3 corresponding to the slidable range of the sliding member 9 are stepped so that when the sliding member 9 is engaged with the lower half 3, there is caused no step between the lower half 3 and the sliding member 9. The right and left side wall portions of the lower half 3 near the front surface portion thereof are stepped inwardly to have steps corresponding to the thicknesses of the arm portions 8a, 8b of the front lid 8 thereby to form support walls 12, 12. Formed on these support walls 12, 12 are cut-out portions 12a, 12a which will form shaft apertures to rotably pivot the shafts of the front lid 8 as will be described later. And, on the support walls 12, 12 backwards the cut-out portions and at their intermediate positions in the up and down direction formed are cut-out portions 12b, 12b of rectangular shape, and operating member insertion apertures 13,13 of rectangular shape are formed through the support walls 12, 12 at the position at which, when the front lid 8 is rotated upwards, the lower portions of the rear surface portions of the arm portions 8a, 8b of the front lid 8 cover the support walls 12, 12, namely, at the positions of the front surface portions of the support walls 12, 12 near the lower ends thereof. In this case, when the lower half 3 and the upper half 2 are coupled to each other to be integral, the support walls 12, 12 and support walls of the upper half 2, which will be described later, abut against one another to permit the cut-out portions 12a, 12a and 12b, 12b to respectively form the shaft apertures and tape end sensing apertures.

Shield walls 14a, 14b and 14c are respectively formed at the right and left side portions and rear surface portion of the cut-out portion 3a, whereby the insides of the cassette casing 1 are shielded from the cut-out portion 3a. Further, formed on the upper edge portions of the right and left side wall portions of the lower half 3 are lateral grooves 15, 15 which are parallel to the front to back direction, respectively. Formed beneath the lateral grooves 15, 15 are slide guide grooves 16, 16 of rectangular shape in cross-section in correspondence with the slidable range of the sliding member 9. In this case, the depths of the lateral grooves 15 and the slidable guide grooves 16 are selected to be smaller than the thicknesses of the arm portions 8a, 8b of the front lid 8.

Reference numerals 17a, 17b respectively designate collar or flange portions of annular shape formed around the pair of reel shaft insertion apertures 5a, 5b. Reference numeral 18 designates a spring incorporating portion of rectangular shape formed at the intermediate position between the reel shaft insertion apertures 5a, 5b in parallel to front and rear direction. Reference numeral 19 designates a spring engaging column member which is positioned near the front surface portion side of the spring incorporating portion 18. Incorporated within the spring incorporating portion 18 is a coil spring 28 for biasing the sliding member 9 as will be described later. This coil spring is engaged at its one end with the spring engaging column member 19.

Figure 4:
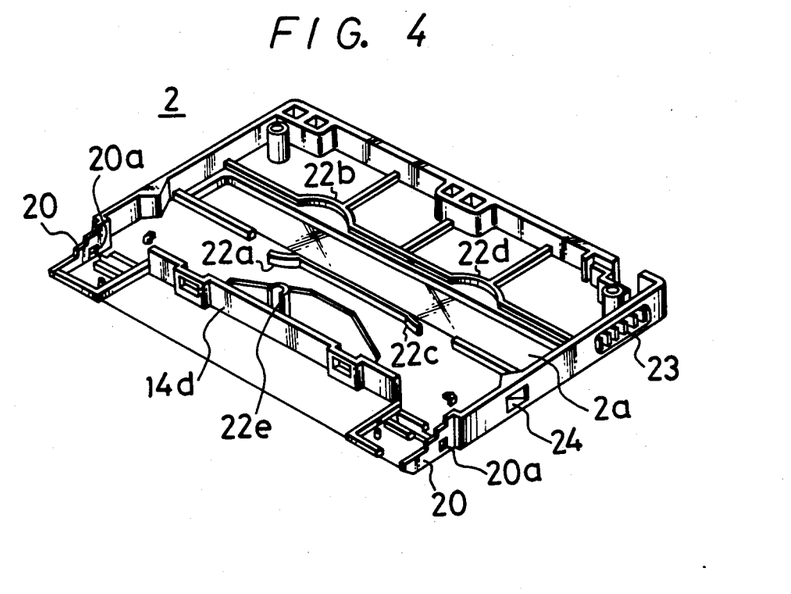
FIG. 4 is a perspective view showing the inside of the upper half of the magnetic tape cassette shown in FIG. 3.
Figure 5:
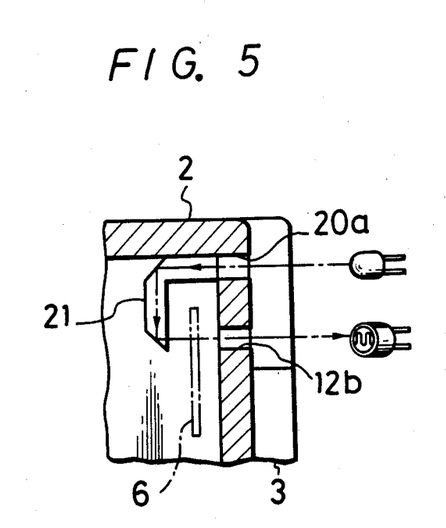
FIG. 5 is a cross-sectional view useful for explaining a prism used in the magnetic tape cassette shown in FIG. 3.

Next, the upper half 2 will be described with reference to FIGS. 3 and 4. Similar to the lower half 3, the upper half 2 consists of a flat plate portion of substantially rectangular shape through which the transparent window plate 2a is formed, and a frame portion which is formed of the right and left side wall portions and the rear surface wall portion except the front surface portion in which the front lid 8 is disposed. In this case, the outer dimension of the upper half 2 is selected to be substantially the same as the outer dimension of the lower half 3 when it is assembled with the sliding member 9 so that when they are assembled, no step is caused between the upper half 2, the lower half 3 and the sliding member 9. Reference numerals 20, 20 respectively designate support walls formed such that the portions of the right and left side wall portions near the front surface portion of the cassette casing are respectively stepped inwardly by the thicknesses of the arm portions 8a, 8b of the front lid 8 in correspondence with the support walls 12, 12 of the lower half 3. The shape of the abutting portions of the support walls 20, 20 and that of the abutting portions of the support walls 12, 12 of the lower half 3 are made complementary to each other. Reference numerals 20a, 20a respectively designate tape end sensing apertures which are formed through the support walls 20, 20 at their rear and upper surface portions. Reference numerals 21, 21 respectively designate transparent prisms of substantially L-shape for detecting or sensing the tape end, and which are located at the insides of the support walls 20, 20 in correspondence with the tape end sensing cut-out portions 12b, 12b and apertures 20a, 20a as shown in FIG. 5. The prisms 21, 21 serve to form the optical paths for the tape end detecting light. Reference numeral 14d designates a shield wall which is formed in correspondence with the shield wall 14c formed at the rearward of the cut-out portion 3a of the lower half 3. When the upper half 2 and the lower half 3 are coupled to each other, the shield wall 14d of the upper half 2 and the shield wall 14c of the lower half 3 abut with each other to thereby shield the inside of the cassette casing 1 from the cut-out portion 3a. Reference numerals 22a, 22b, 22c and 22d respectively designate collar or flange portions of arc shape which are formed so as to correspond to the annular collar portions 17a, 17b formed on the lower half 3. By the cooperation of the collar portions 22a, 22b and 22c, 22d of the upper half 2 with the collar portions 17a, 17b of the lower half 3, the reel hubs 4a and 4b around which the magnetic tape 6 is wound are respectively supported so as to be able to rotate. In this case, the heights of the collar portions 22a, 22b, 22c and 22d are selected to be substantially the same as the thickness of the portions of the reel brake member 11, which will be described later, and which portions are along the upper half 2 so that the reel brake member 11 is prevented from being protruded beyond the collar portions 22a, 22b, 22c and 22d, thus the magnetic tape 6 wound around the pair of reel hubs 4a, 4b being protected from a bad influence. Reference numeral 22e designates a fixing boss of U-shape which is formed in correspondence with the spring engaging column member 19 formed on the lower half 3. When the upper half 2 and the lower half 3 are coupled integral to each other, the spring engaging column member 19 is located within the opening portion of the fixing boss 22e and hence one end of the coil spring 28, described later is fixed by the end portion of this fixing boss 22e. Reference numerals 23, 23 respectively designate concave and convex portions which are formed on the right and left side wall portions near the rear surface portion for preventing any sliding of the cassette casing 1. Reference numerals 24, 24 respectively designate support pockets of substantially V-shape which are formed at nearly the central portions of the right and left side wall portions. When the tape cassette is loaded on the recording and reproducing apparatus, the support portions 24, 24 are held by support projections (not shown) from both right and left directions.

The reel brake member 11 will further be described with reference to FIG. 3. The reel brake member 11 consists of a slide guide plate 11a which is along the inner surface of the upper half 2 and arms 11b, 11c of L-shape which are respectively extended downwards and perpendicularly from both end portions of the slide guide plate 11a. In this case, brake projection members 11d and 11e corresponding to the pair of reel hubs 4a, 4b are formed at the rear surface portion side of the slide guide plate 11a. In correspondence with the brake members 11d and 11e, ratchet wheels are formed on the outer peripheral portions of the reel hubs 4a, 4b near the upper half 2.

Further, a spring engaging portion 11f is provided at the central portion of the slide guide plate 11a and operating members 11g, 11h are respectively formed on the end portions of the arms 11b and 11c. In this case, a spring 25 which is used to bias the reel brake member 11 is engaged with the spring engaging portion 11f and the free ends of this spring 25 urge the shield wall 14d of the upper half 2 so that the brake members 11d, 11e are engaged with the ratchet wheels formed on the outer peripheral portions of the reel hubs 4a, 4b by the biasing force of the spring 25, whereby the pair of reel hubs 4a, 4b are locked so as not to be rotated. Moreover, when the reel brake member 11 is disposed within the cassette casing 1, the end portions of the operating members 11g, 11h are respectively protruded through the operating member insertion apertures 13, 13 of the lower half 3 to the outsides of the support walls 12, 12 by a predetermined amount, whereby when the front lid 8 is rotated upwards, the operating members 11g, 11h thus protruded are urged by the end portions of the arm portions 8a, 8b of the front lid 8, the reel brake member 11 is slid forwards against the biasing force of the spring 25, and hence the brake members 11d, 11e are disengaged from the ratchet wheels of the reel hubs 4a, 4b and whereupon pair of reel hubs 4a, 4b become rotatable.

The front lid 8 will further be described with reference to FIG. 3. This front lid 8 consists of a plate portion 8c which closes the front surface portion of the cassette casing 1 and arm portions 8a, 8b provided at both side end portions of the plate portion 8c so as to oppose each other to be of substantially U-shape viewed from above. In this case, when the front lid 8 is rotated at the position to close the front surface portion of the cassette casing 1, the arm portions 8a, 8b of the front lid 8 cover the right and left side support walls 20, 20 of the upper half 2, and when the front lid 8 is at this rotation position, the sliding member 9 can be located under the arm portions 8a, 8b. Further, rotary shafts 8d, 8d are provided at substantially the central positions on the inner surfaces of the arm portions 8a, 8b. Reference numerals 8e and 8f respectively designate cutaway portions which are formed by cutting away the plate portion 8c to U-shape in correspondence with both right and left sides of the cut-out portion 3a of the lower half 3.

Figure 6:
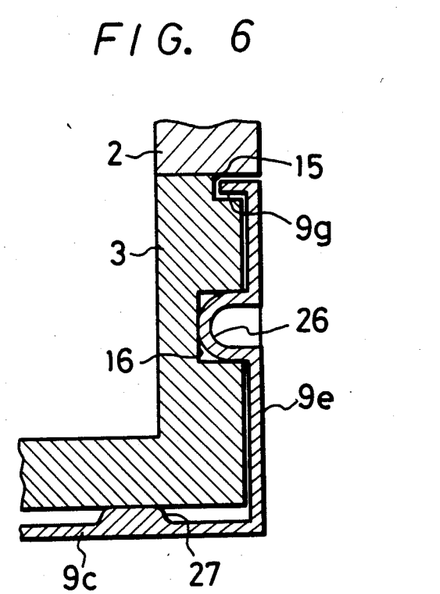
FIG. 6 is a cross-sectional view useful for explaining the slider used in the magnetic tape cassette shown in FIG. 3.

The sliding member 9 will be described more fully with reference to FIGS. 3 and 6. This sliding member 9 consists of a flat plate portion 9c which is along the lower surface portion of the lower half 3, and side plate portions 9d, 9e which are located at both right and left sides of the flat plate portion 9c and along the right and left side wall portions of the lower half 3 so as to be substantially U-shaped as seen from the front and rear direction. Reference numerals 9f and 9g respectively designate bent portions which are provided by bending the upper end portions of the side plate portions 9d, 9e to a hook shape. The bent portions 9f, 9g are located within the lateral grooves 15, 15 when the sliding member 9 is assembled to the cassette casing 1 as shown in FIG. 6. Further, in correspondence with the slide guide grooves 16, 16 of the lower half 3, projected portions 26, 26 are formed at the left and right side plate portions 9d and 9e at their predetermined positions which protrude to the side of the cassette casing 1. The cassette casing 1 sides of the projected portions 26, 26 are formed as smooth curved surfaces so as to make the contact angles with the slide guide grooves 16, 16 become obtuse angles as shown in FIG. 6. Thus, the contacts of the top surfaces of the projected portions 26, 26 with the bottom surfaces of the slide guide grooves 16, 16 make the positioning of the sliding member 9 in the left and right direction of the cassette casing 1, while the contacts of the upper and lower side portions of the top portions of the projected portions 26, 26 with the side surface portions of the slide guide grooves 16, 16 make the positioning of the sliding member 9 in the up and down direction of the cassette casing 1. Further, reference numerals 27, 27 respectively designate protruded portions which are formed on the flat plate portion 9c near both the left and right sides thereof and in parallel to the back and forth direction thereof. In this case, the protruded portions 27, 27 and the projected portions 26, 26 are slidably moved relative to the cassette casing 1. Reference numeral 9h designates a spring engaging piece member which is formed on the flat plate portion 9c in correspondence with the spring incorporating portion 18 of the lower half 3.

Reference numeral 28 designates a tension coil spring which is adapted to bias the sliding member 9. One end of this tension coil spring 28 is engaged with the spring engaging column member 19 of the lower half 3 and the other end thereof is engaged with the spring engaging piece member 9h with the result that the sliding member 9 is biased forward to close the cut-out portion 3a. Reference numerals 9i and 9j respectively designate contact piece members which are perpendicularly erected from the front end portion of the flat plate portion 9c so as to correspond to the cut-away portions 8e and 8f of the front lid 8.

The operation of the tape cassette thus made will be described with reference to FIGS. 7 to 10.

Figure 7:
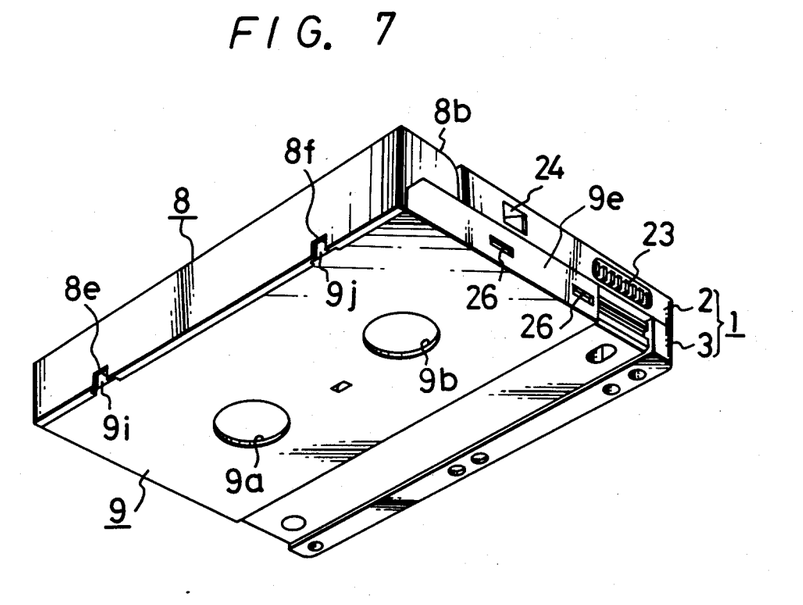
FIG. 7 is a perspective view showing the magnetic tape cassette shown in FIG. 3 in its non-use mode.
Figure 8:
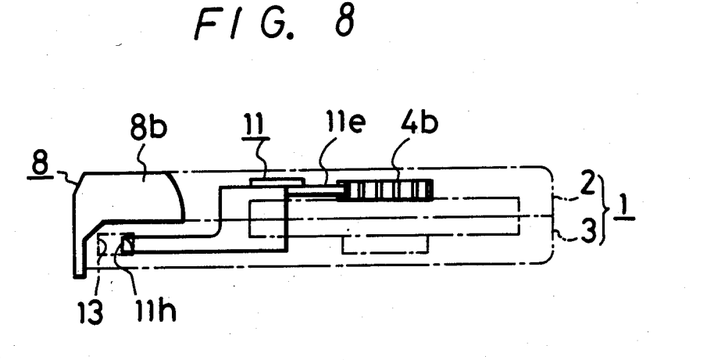
FIG. 8 is a schematic diagram useful for explaining FIG. 7.

When not in operation, as shown in FIGS. 7 and 8, the front surface portion of the cassette casing 1 is closed by the front lid 8 and the sliding member 9 biased by the coil spring 28 is slid forward. At that time, the reel brake member 11 is biased in the backward direction by the spring 25 and hence the brake members 11d, 11e thereof are engaged with the ratchet wheels of the reel hubs 4a, 4b so that the reel hubs 4a, 4b are locked so as not to rotate Further, the reel shaft insertion apertures 5a, 5b of the cassette casing 1 and the reel shaft insertion corresponding apertures 9a, 9b formed through the sliding member 9 are displaced in position from each other and the cut-out portion 3a of the cassette casing 1 is closed by the sliding member 9 so that the magnetic tape 6 is closed tight against dust which is prevented from adhering through the reel shaft insertion apertures 5a, 5b and the cut-out portion 3a to the magnetic tape 6 and against fingers and the like touching the magnetic tape 6. Furthermore, the side plate portions 9d, 9e of the sliding member 9 are located beneath the arm portions 8a, 8b of the front lid 8 and the upper end surfaces of the side plate portions 9d, 9e of the sliding member 9 abut the lower end surfaces of the arm portions 8a, 8b of the front lid 8, whereby the front lid 8 can be locked so as not to rotate. As a result, when not in operation, the front lid 8 can be prevented from being rotated unintentionally. Accordingly, when not in use, the front lid 8 is prevented from being rotated unintentionally to expose the magnetic tape 6 at the front surface portion of the cassette casing 1.

During operation, the tape cassette is loaded on the recording and reproducing apparatus. That is, when the tape cassette is inserted into the recording and reproducing apparatus, fixed projection members (not shown) of the recording and reproducing apparatus contact through the cut-away portions 8e, 8f of the front lid 8 to the contact piece members 9i, 9j of the sliding member 9. Then, when the tape casette is further inserted to the predetermined position in the recording and reproducing apparatus under the above state, under the state that the sliding member 9 is fixed by the fixed projection members of the recording and reproducing apparatus side, the cassette casing 1 is moved against the biasing force of the coil spring 28 and hence the sliding member 9 is slid backwards, relative to the cassette casing 1. In this case, since the projected portions 26, 26 having the smooth curved surfaces slidably engage with the slide guide grooves 16, 16 of the cassette casing 1, even if the sliding member 9 is slid along the casette casing 1, the slide guide grooves 16, 16 of the cassette casing 1 are never scarred and cut down. Furthermore, since the sliding member 9 is slidably supported to the cassette casing 1 by the projected portions 26, 26 and the protruded portions 27, 27, the contact area of the cassette casing 1 with the sliding member 9 is relatively small so that the sliding resistance of the sliding member 9 against the cassette casing 1 can be small.

Figure 9:
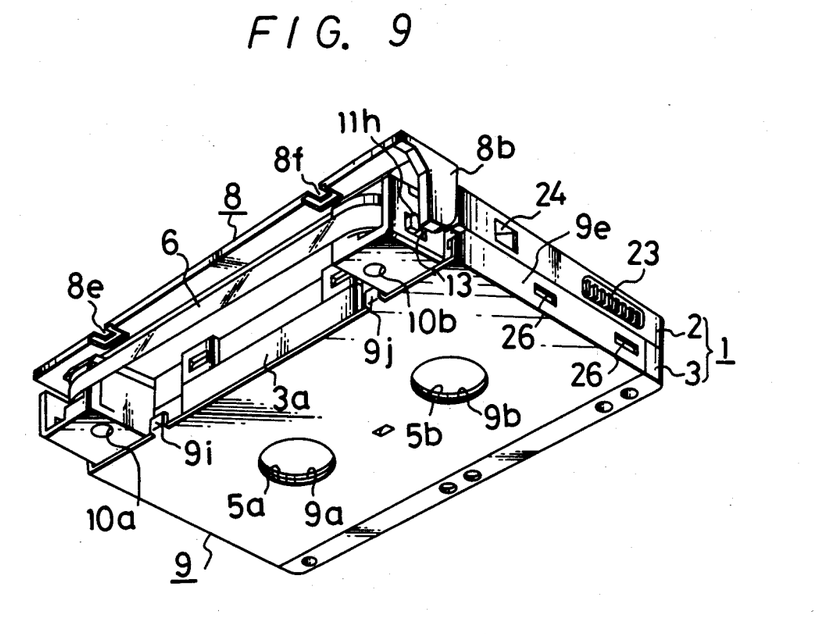
FIG. 9 is a perspective view showing the magnetic tape cassette shown in FIG. 3 in its use-mode.
Figure 10:
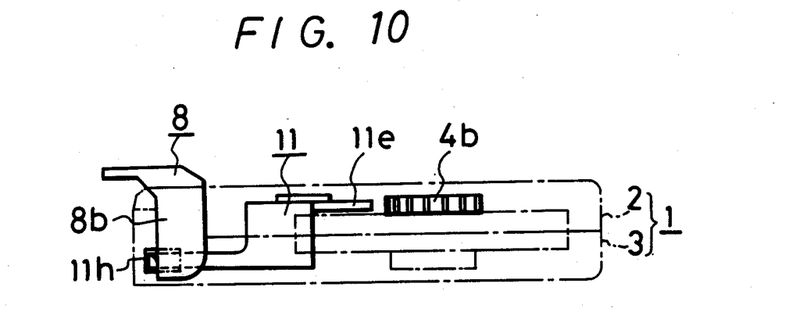
FIG. 10 is a schematic diagram useful for explaining FIG. 9.

As described above, since the sliding member 9 is slid backwards, the cut-out portion 3a and the positioning apertures 10a, 10b are opened and the reel shaft insertion corresponding apertures 9a, 9b of the sliding member 9 are made corresponding to the reel shaft insertion apertures 5a, 5b of the cassette casing 1 so that the reel shaft insertion apertures 5a, 5b are opened. Then, under this state, the front lid 8 is rotated upwards by a lid rotating member (not shown) of the recording and reproducing apparatus and put into the state as shown in FIGS. 9 and 10. In this case, when the front lid 8 is rotated in the upper direction, the operating members 11g, 11h of the reel brake member 11 are pressed forward by the lower end portions of the arm portions 8a, 8b to thereby slide the reel brake member 11 forward against the biasing force of the spring 25. At that time, the engagements between the brake members 11d, 11e of the reel brake member 11 and the ratchet wheels of the reel hubs 4a, 4b are released to release the reel hubs 4a, 4b from the locked state so that the reel hubs 4a and 4b can rotate.

Under such state, positioning pins (not shown) and reel shafts (not shown) of the recording and reproducing apparatus are respectively inserted into the positioning apertures 10a, 10b and the reel shaft insertion apertures 5a, 5b, the magnetic tape 6 is exposed at the front surface portion of the cassette casing 1 and the tape guide system (not shown) is inserted into the cut-out portion 3a. Thus, by this guide system, the magnetic tape 6 is drawn out forwards and loaded on the rotary drum of the recording and reproducing apparatus and then the predetermined recording and playback may be carried out.

When the mode of the magnetic tape cassette is changed from use-mode to non-use mode contrary to the above, the operation opposite to the above operation will be carried out.

The portions inside the left and right support walls 12, 12 and 20, 20 of the tape cassette thus made are complicated in construction and have much restrictions in view of space. Accordingly, the tape end sensing prisms 21, 21 which are respectively fixed to the insides of the left and right support walls 20, 20 become extremely small parts so that to attach these small prisms 21, 21 to the insides of the left and right support walls 20, 20 in correspondence with the tape end sensing apertures 20a, 20a is inevitably very difficult.

OBJECTS AND SUMMARY OF THE INVENTION

Accordingly, it is an object of this invention to provide an improved magnetic tape cassette.

It is another object of this invention to provide a lidded magnetic tape cassette in which, when the front lid thereof is rotated, a bad influence can be prevented from being exerted upon a magnetic tape.

It is still another object of this invention to provide a magnetic tape cassette which can be assembled with ease.

It is a further object of this invention to provide a magnetic tape cassette which can reduce the number of its assembling processes and its assembly parts, the cost thereof being lowered.

It is yet a further object of this invention to provide a manetic tape cassette suitable for recording and reproducing a digital signal, for example, a PCM (pulse code modulated) signal.

According to one aspect of this invention, there is provided a magnetic tape cassette comprising:

(a) a cassette casing having incorporated therein a pair of reel hubs around which a magnetic tape is wound;

(b) a transparent window plate formed on an upper surface of said cassette casing to see therethrough said pair of reel hubs;

(c) an optical guide provided in a tape running path within a side wall of said cassette casing for detecting a tape end; and (d) a coupling member for coupling said transparent window plate and said optical guide, wherein said transparent window plate, said optical guide and said coupling member are formed integral by transparent synthetic resin.

Other objects, features and advantages of the present invention will become apparent from the following description taken in conjunction with the accompanying drawings through which the like references designate the same elements and parts.

DESCRIPTION OF THE PREFERRED EMBODIMENTS

Figure 11:
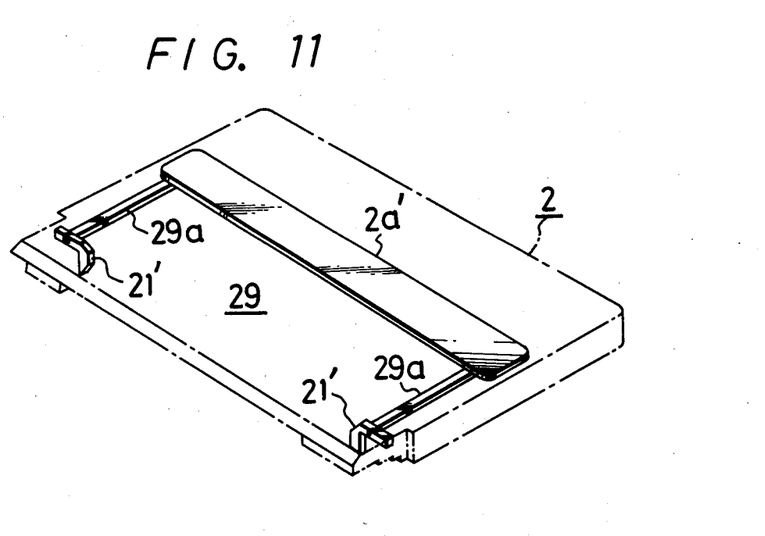
FIG. 11 is a plan view showing a main part of an embodiment of the magnetic tape cassette according to this invention.

An embodiment of an improved magnetic tape cassette according to this invention, is shown in FIG. 11. In FIG. 11, like parts corresponding to those in FIGS. 1 to 10 are marked with the same references and will not be described in detail.

In this embodiment, a transparent window plate 2a' and tape end sensing prism plates 21', 21' are formed integrally by a transparent synthetic resin, for example, acryl resin. In this case, the integrated transparent member 29 is so formed that the window plate 2a' and the prisms 21', 21' may be located relative to the upper half 2 with predetermined positions. Though not shown, the upper half 2, the lower half 3, the brake member 11, the front lid 8 and the sliding member 9 of this embodiment are formed similarly to those of the magnetic tape cassette as shown in FIGS. 1 to 10.

According to the tape cassette of this invention thus made, upon assembling, if the integrated transparent member 29 is attached to the upper half 2 such that the transparent window plate 2a' is positioned at the predetermined position of the upper half 2, the extremely small prisms 21', 21' are automatically attached to the insides of the support walls 20, 20 at their predetermined proper positions. Accordingly, since it becomes unnessary that the very small prisms 21', 21' be individually attached to the upper half 2 at predetermined positions, assembling work of this embodiment can be saved. There is then an advantage that the magnetic tape cassette of the invention can be assembled easily and simply. Further, since the window plate 2a' and the prisms 21', 21' are formed integral, it is possible to reduce the number of the manufacturing processes and the assembly of parts, resulting in an advantage that the magnetic tape cassette of the invention can be produced at lower cost.

Figure 12:
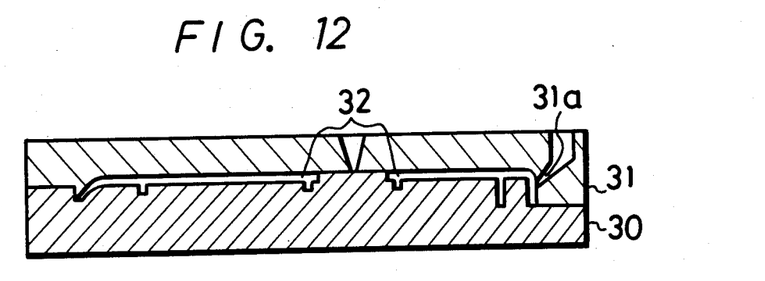
FIGS. 12 and 13 are respectively cross-sectional views useful for explaining another embodiment of the magnetic tape cassette according to this invention.
Figure 13:
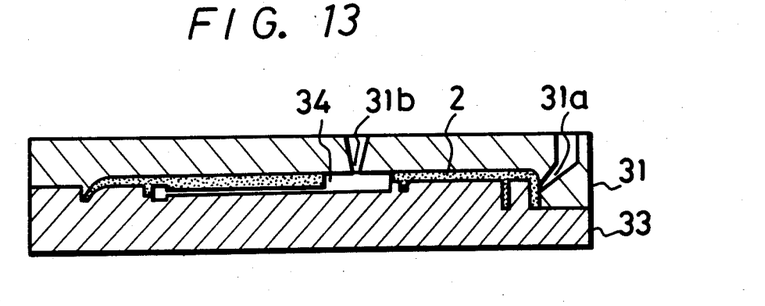

FIGS. 12 and 13 respectively show the main part of another embodiment of the magnetic tape cassette according to the present invention. In FIGS. 12 and 13, like parts corresponding to those in FIGS. 1 to 11 are marked with the same references and will not be described in detail.

In this embodiment, upon manufacturing, the integrated transparent member 29 and the upper half 2 are formed integral. More specifically, upon injection-molding, as shown in FIG. 12, injected into a cavity 32, which is formed by a first lower metal mold 30 and an upper metal mold 31 and in which the upper half 2 will be formed is a melted opaque resin through a gate 31a to thereby injection-mold the upper half 2. Thereafter, the first lower metal mold 30 is removed and then, as shown in FIG. 13, a second lower metal mold 33 is coupled integral to the upper metal mold 31 and the upper half 2 thus molded. Then, injected into a cavity 34, which is formed by the second lower metal mold 33, the upper metal mold 31 and the upper half 2 and in which the integrated transparent member 29 will be formed, is a melted transparent resin through a gate 31b, whereby the integrated transparent member 29 is injection-molded. In this case, when the melted transparent resin is injected into the cavity 34, due to the heat and the injection pressure of the melted transparent resin, the contact area of the hardened upper half 2 with the melted transparent resin is put into a half-melted state.

Then, when the upper half 2 in the half-melted state is again hardened and the transparent resin is also hardened, the integrated transparent member 29 which is made of transparent resin is formed integral with the upper half 2.

According to this embodiment, upon manufacturing, since the integrated transparent member 29 and the upper half 2 are formed integral to be an unitary body, it is possible to achieve a similar action and effect to those of the embodiment shown in FIG. 11 and also to considerably simplify the manufacturing process of the magnetic tape cassette.

While in the above embodiments the tape end sensing prisms 21', 21' are used as the tape and detecting transparent member, it can easily be understood that other transparent member for detecting the kinds of the magnetic tape or the like can be used with the similar action and effect to those of the above embodiments being achieved.

In accordance with the magnetic tape cassette of the invention, upon manufacturing, it is possible to save labor and to assemble the magnetic tape cassette with ease. In addition, it is possible to reduce the number of the manufacturing processes and the assembly parts so that the magnetic tape cassette of the invention can be produced at lower cost.

The above description is given on the preferred embodiments of the invention, but it will be apparent that many modifications and variations could be effected by one skilled in the art without departing from the spirit or scope of the novel concepts of the invention, so that the scope of the invention should be determined by the appended claims only.

We claim as our invention:

1. A magnetic tape cassette including a magnetic tape, comprising:
   (a) a cassette casing having an upper surface and side walls and having incorporated therein a pair of reel hubs around which the magnetic tape is wound;
   (b) a transparent window plate formed on the upper surface of said cassette casing to see therethrough said pair of reel hubs;
   (c) a tape running path carrying the tape from one hub to the other and along at least one side wall;
   (d) an optical guide provided in the tape running path within the one side wall of said cassette casing for detecting a tape end; and
   (e) a coupling member for coupling said transparent window plate and said optical guide, wherein said transparent window plate, said optical guide and said coupling member are formed integrally of transparent synthetic resin.

2. A magnetic tape cassette according to claim 1, in which said tape end sensing optical guide is provided with said tape running path within two side walls of said cassette casing and said tape end sensing optical guides are connected with a pair of connecting members extended from said transparent window plate.

* * * * *